Patented June 30, 1925.

1,544,114

UNITED STATES PATENT OFFICE.

HANS WEIDMANN, OF FRANKFORT-ON-THE-MAIN, GERMANY, ASSIGNOR TO AMERICAN LURGI CORPORATION, OF NEW YORK, N. Y., A CORPORATION OF NEW YORK.

PROCESS OF RECOVERING PURE LITHIUM SALTS.

No Drawing.   Application filed November 24, 1924. Serial No. 752,035.

*To all whom it may concern:*

Be it known that I, HANS WEIDMANN, a citizen of Germany, residing at Frankfort-on-the-Main, Germany, have invented certain new and useful Improvements in Processes of Recovering Pure Lithium Salts, of which the following is a specification.

In the treatment of lithium containing minerals for the production of lithium salts in accordance with the known decomposition methods there are obtained solutions which contain the lithium mostly in the form of sulfate.

Such solutions contain impurities such as salts of aluminum, iron, magnesium, manganese, etc., in varying amounts and are extensively purified before the lithium is recovered in the known manner by precipitation in the form of its difficultly soluble salts such as the carbonate, fluoride or phosphate. The known purification is accomplished by treating the solutions with lime or calcium carbonate and with oxidizing agents such as chloride of lime to effect the oxidation of divalent iron and manganese. It is however impossible in this way to remove all of the impurities which precipitate with and contaminate the lithium salts product. There are in particular always small quantities of calcium sulfate and usually also traces of sulfates of manganese and magnesium in the so purified solutions which contaminate the lithium salt precipitated therefrom.

It has been found that the impurities in lithium salt solutions such as the solutions purified in the usual way as described above, may be removed to such degree that lithium salts of a high degree of purity may be produced by treating such solutions with alkali metal salts of acids such as the alkali metal carbonates, fluorides and phosphates which form difficultly soluble salts of lithium. Lithium salts of such acids are particularly advantageous for this purpose in that the use of an excess thereof in the purification does not cause the precipitation of lithium along with the impurities which may occur when an excess of the more soluble salts of the other alkali metals is used.

The invention is illustrated in the following example:

Lepidolite containing approximately 1% of lithium is decomposed by means of sulfuric acid and strongly calcined to decompose sulfates of iron and aluminum. The aqueous extract of the calcined material is then treated with lime and with chlorid of lime in the usual way to remove the bulk of the impurities. The resulting partially purified solution which now contains besides the sulfates of lithium and potassium also traces of impurities such as calcium sulfate, etc., and which may contain for example 6.6 g. of lithium per liter, is then treated with a concentrated solution (about 1%) of lithium carbonate until no further precipitation takes place. Depending upon the purity of the solution from 100 to 150 cc. of the lithium carbonate solution per liter of the solution to be purified may be required. The so purified solution after being separated from the precipitated impurities is treated with pure potassium carbonate. The lithium carbonate so precipitated after being separated by filtration, washed and dried, is of high purity.

Instead of using lithium carbonate as the purifying agent as in the foregoing example other alkali metal carbonates or other salts of the alkali metals such as the phosphates and fluorides may be used as the purifying agent, and instead of precipitating the lithium content of the purified solution as carbonate, it may be precipitated in the form of other difficultly soluble salts such as the phosphate or fluoride by using as the precipitating agent a more soluble corresponding salt of another alkali metal. For instance the lithium content of a solution purified by the use of lithium carbonate may be precipitated as the phosphate or fluoride or the solution may be purified by treatment with sodium or potassium carbonate followed by the precipitation of lithium as carbonate, phosphate, fluoride, etc., by the use of the corresponding salt of sodium or potassium as the precipitating agent.

The mother liquor in the case of the precipitation of the lithium content of the solution as carbonate, due to the slight solubility thereof still contains a quantity of lithium which is recoverable by precipitation in the form of salts less soluble than the carbonate. The lithium content of such mother liquor may be precipitated directly in the form of salts of high purity by treating the mother liquor with an alkali metal salt which is more soluble than the corresponding lithium salt, said lithium salt being less soluble than the carbonate. Thus the lithium content of a mother liquor resulting from the precipitation of lithium as carbonate may be precipitated by treating it with sodium or potassium phosphate or fluoride. Or after precipitating as much of the lithium content of the mother liquor as is possible in the form of fluoride, a further precipitation as phosphate may be resorted to.

The mother liquor from each precipitation may if desired be treated in the same manner as the original lithium containing solution. For instance the mother liquor from the lithium carbonate precipitation may be purified by treatment with alkali metal fluoride and the lithium content of the resulting solution precipitated as fluoride or phosphate, and after the purification and precipitation of lithium from the first mother liquor with fluoride, the resulting mother liquor may be purified and precipitated with phosphate.

While the process of my invention is particularly applicable for the treatment of solutions of lithium salts prepared in the usual way by the treatment of lithium ores with sulfuric acid and partial purification of the crude solutions with lime, calcium carbonate, and chloride of lime, as described in the foregoing illustrative example, it will be apparent that the process may be applied for the preparation of pure lithium salts from other materials such as for instance commercial lithium salts contaminated with impurities such as compounds of calcium, magnesium, aluminum, iron, manganese, etc.

I claim:

1. Process of preparing pure lithium salts which comprises treating a solution containing a lithium salt and impurities with an alkali metal salt of an acid, the lithium salt of which is less soluble than the lithium salt in said solution in quantity insufficient to precipitate said less soluble lithium salt, separating precipitated impurities, and recovering a lithium salt from the purified solution.

2. Process of preparing pure lithium salts which comprises treating a solution containing a lithium salt and impurities with a lithium salt which is less soluble than the lithium salt in said solution, separating precipitated impurities, and recovering a lithium salt from the purified solution.

3. Process of preparing a pure lithium salt which comprises treating a solution containing a lithium salt which is more soluble than lithium carbonate and impurities with an alkali metal salt of an acid, the lithium salt of which is not more soluble than lithium carbonate in quantity insufficient to precipitate lithium carbonate from said solution, separating precipitated impurities, and recovering a lithium salt from said solution.

4. Process of preparing a pure lithium salt which comprises treating a solution containing a lithium salt which is more soluble than lithium carbonate and impurities with a lithium salt which is not more soluble than the carbonate, separating precipitated impurities, and recovering a lithium salt from the purified solution.

5. Process of preparing a pure lithium salt which comprises treating a solution containing a lithium salt which is more soluble than lithium carbonate and impurities with lithium carbonate, separating precipitated impurities, and recovering a lithium salt from the purified solution.

6. Process of preparing a pure lithium salt which comprises treating a solution containing lithium sulfate and impurities with an alkali metal salt of an acid the lithium salt of which is less soluble than lithium sulfate in quantity insufficient to precipitate said less soluble lithium salt, separating precipitated impurities, and recovering a lithium salt from the purified solution.

7. Process of preparing pure lithium salts which comprises treating a solution containing lithium sulfate and impurities with a lithium salt less soluble than lithium sulfate, separating precipitated impurities and recovering a lithium salt from the purified solution.

8. Process of preparing pure lithium salts which comprises treating a solution containing lithium sulfate and impurities with lithium carbonate, separating precipitated impurities and recovering a lithium salt from the purified solution.

9. Process of preparing pure lithium salts as defined in claim 1 in which the lithium salt is recovered from the purified solution by treating the same with a salt of an alkali metal which is more soluble than the corresponding lithium salt and more soluble than the lithium salt in the purified solution.

10. Process of preparing pure lithium salts which comprises treating a solution containing a lithium salt and impurities with an alkali metal salt of an acid the lithium salt of which is less soluble than the lithium salt in said solution in quantity insufficient to precipitate said less soluble lithium salt, separating precipitated impurities, precipitating a lithium salt from the purified solution by treating the same with a salt of an alkali metal which is more soluble than the corresponding lithium salt and more soluble than the lithium salt in said first named solution, separating the precipitated lithium salt from mother liquor, and treating the mother liquor with an alkali metal salt of an acid the lithium salt of which is less soluble than said precipitated lithium salt.

In testimony whereof, I affix my signature.

Dr. HANS WEIDMANN.

Attest:
 ROBERT ENGLER,
 MAX SCHARFE.